United States Patent
Ikuta et al.

(10) Patent No.: US 9,124,156 B2
(45) Date of Patent: Sep. 1, 2015

(54) ROTOR FOR ELECTRIC ROTATING MACHINE

(71) Applicant: DENSO CORPORATION, Kariya, Aichi-pref. (JP)

(72) Inventors: Hiroyuki Ikuta, Anjo (JP); Atsuo Ishizuka, Nagoya (JP); Junichi Nakazono, Okazaki (JP)

(73) Assignee: DENSO CORPORATION, Kariya (JP)

(*) Notice: Subject to any disclaimer, the term of this patent is extended or adjusted under 35 U.S.C. 154(b) by 157 days.

(21) Appl. No.: 13/909,353

(22) Filed: Jun. 4, 2013

(65) Prior Publication Data
US 2013/0334907 A1    Dec. 19, 2013

(30) Foreign Application Priority Data

Jun. 13, 2012  (JP) .................................. 2012-133951

(51) Int. Cl.
*H02K 1/27*    (2006.01)
*H02K 15/12*   (2006.01)

(52) U.S. Cl.
CPC .............. *H02K 1/2706* (2013.01); *H02K 1/276* (2013.01); *H02K 15/12* (2013.01)

(58) Field of Classification Search
CPC ........................................................ H02K 1/276
USPC .............................. 310/43, 45, 156.22, 156.23
See application file for complete search history.

(56) References Cited

U.S. PATENT DOCUMENTS

| | | | |
|---|---|---|---|
| 5,091,668 A * | 2/1992 | Cuenot et al. | 310/156.61 |
| 7,612,478 B2 * | 11/2009 | Marioni | 310/156.28 |
| 7,965,009 B2 * | 6/2011 | Miyashita et al. | 310/156.28 |
| 2013/0334910 A1 * | 12/2013 | Takahashi et al. | 310/52 |

FOREIGN PATENT DOCUMENTS

JP    2007-236019    9/2007

OTHER PUBLICATIONS

Machine translation of JP 2007-236019 available from the JPO.

* cited by examiner

*Primary Examiner* — Dang Le
(74) *Attorney, Agent, or Firm* — Nixon & Vanderhye P.C.

(57) ABSTRACT

The rotor for an electric rotating machine includes a rotor core fixed to a rotating shaft and formed with at least one magnet accommodating hole, a magnet accommodated in the magnet accommodating hole, a resin portion filled in the magnet accommodating hole accommodating the magnet, a first end plate fixed to the rotating shaft at one axial side of the rotor core, and a second end plate fixed to the rotating shaft at the other axial side of the rotor core. The axial fixing force of the second end plate against the rotating shaft is smaller than that of the first end plate. At least a part of the resin portion is present in an axial area between the magnet accommodated in the magnet accommodating hole and the first end plate, and the magnet is in direct contact with the second end plate.

7 Claims, 6 Drawing Sheets

ROTOR FOR ELECTRIC ROTATING MACHINE

This application claims priority to Japanese Patent Application No. 2012-133951 filed on Jun. 13, 2012, the entire contents of which are hereby incorporated by reference.

BACKGROUND OF THE INVENTION

1. Field of the Invention

The present invention relates to a rotor of an electric rotating machine mounted on an electric vehicle or a hybrid vehicle to be used as a motor or an alternator.

2. Description of Related Art

Japanese Patent Application Laid-open No. 2007-236019 describes a rotor of a vehicle-mounted electric rotating machine, including a rotor core fixed to a rotating shaft and formed with magnet accommodating holes, magnets accommodated in the magnet accommodating holes, a filling portion made of resin and filled in each magnet accommodating hole, a first end plate fixed to the rotating shaft at the side of one axial end of the rotor core, and a second end plate fixed to the rotating shaft at the side of the other axial end of the rotor core, the fixing force of the second end plate against the rotating shaft being weaker than that of the first end plate.

The first end plate is in direct contact with the magnets, while on the other hand, the filling portion is interposed between the second end plate and each of the magnets. Since the first end plate is in direct contact with the magnets, the heat generated while the rotor rotates can be dissipated to the outside.

However, since the linear expansion coefficient of the filling portion made of resin is larger than that of the rotor core and magnets, the filling portions expand and press the second end plate while the rotor rotates and generates heat. As a result, the second end plate departs from the rotor core, causing the fixing force of the second endplate against the rotating shaft to decrease. Hence, the fixing force of the second end plate against the rotating shaft which is initially lower than that of the first end plate further decreases.

SUMMARY

An exemplary embodiment provides a rotor for an electric rotating machine including:

a rotor core fixed to a rotating shaft of the electric rotating machine and formed with at least one magnet accommodating hole;

a magnet accommodated in the magnet accommodating hole;

a resin portion filled in the magnet accommodating hole accommodating the magnet;

a first end plate fixed to the rotating shaft at a first axial side of the rotor core; and a second end plate fixed to the rotating shaft at a second axial side axially opposite to the first axial side of the rotor core, an axial fixing force of the second end plate against the rotating shaft being smaller than an axial fixing force of the first end plate against the rotating shaft;

wherein at least a part of the resin portion is present in an axial area between the magnet accommodated in the magnet accommodating hole and the first end plate, and the magnet is in direct contact with the second end plate.

According to the exemplary embodiment, there is provided a rotor of the type including at least one magnet embedded in its rotor core fixed to a rotating shaft, the rotor having capabilities of effectively dissipating heat from the magnet and preventing decrease of the fixing forces of the end plates of the rotor core against the rotating shaft.

Other advantages and features of the invention will become apparent from the following description including the drawings and claims.

PREFERRED EMBODIMENTS OF THE INVENTION

Figure 1:
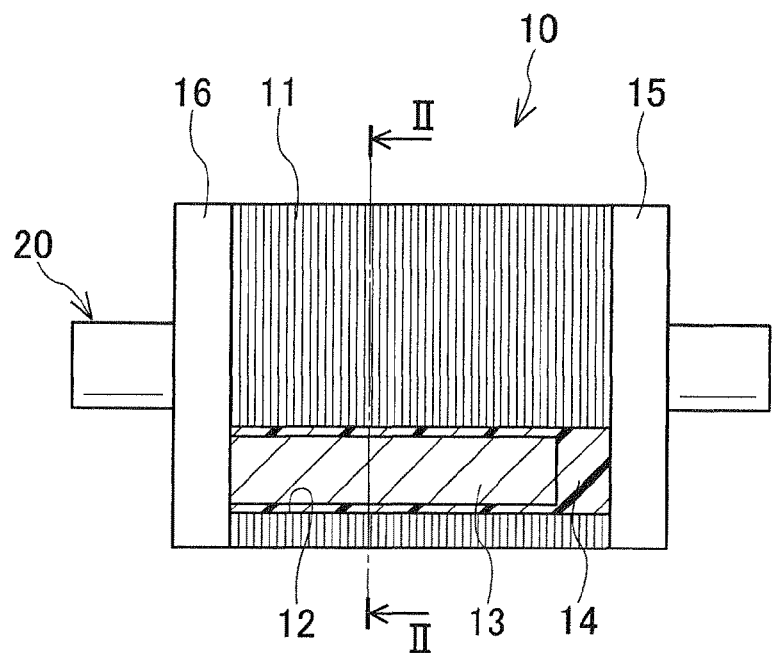
FIG. 1 is an axial cross-sectional view of a rotor according to a first embodiment of the invention.

In the embodiments described below, the same parts or components are indicated by the same reference numerals or letters.

First Embodiment

A rotor 10 according to a first embodiment of the invention is described with reference to FIGS. 1 and 2. The rotor 10 is, for example, used for an electric rotating machine used as a vehicle-driving motor. The rotor 10 is rotatably disposed at the side of the inner periphery of a stator (not shown) of the electric rotating machine housed in a housing of the electric rotating machine. The electric rotating machine includes a rotating shaft 20 rotatably supported by the housing at its both ends through bearings. The rotor 10 is fitted and fixed to the outer peripheral surface of the rotating shaft 20.

Figure 2:
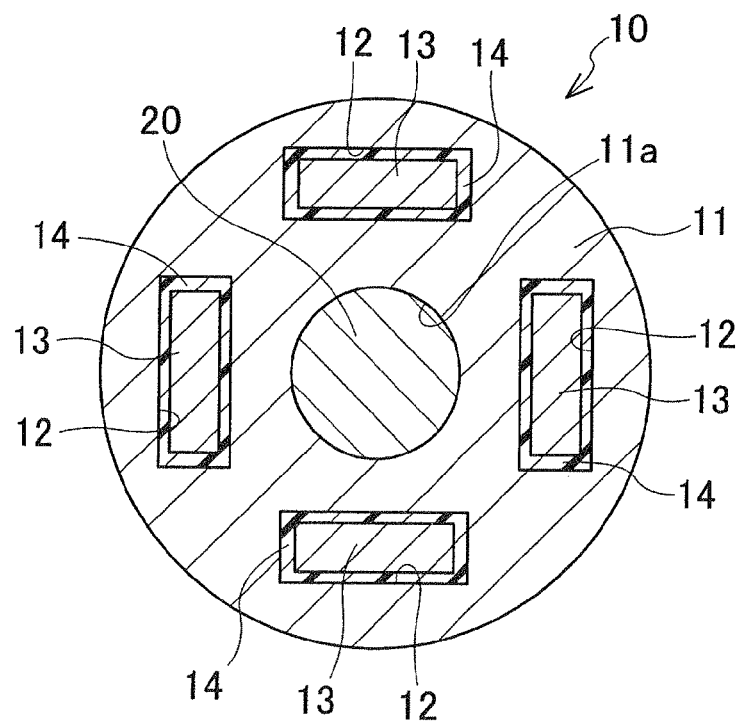
FIG. 2 is a cross-sectional view of FIG. 1 taken along line II-II.

As shown in FIGS. 1 and 2, the rotor 10 includes a rotor core 11 fitted to the outer periphery of the rotating shaft 20 and formed with at least one or a plurality of (four in this embodiment) magnet accommodating holes 12, at least one or a plurality of (four in this embodiment) magnets (permanent magnets) 13 respectively embedded in the magnet accommodating holes 12, resin portions 14 respectively filled in the magnet accommodating holes 12, a first end plate 15 fixed to the rotating shaft 20 at the axially right side (the right side in FIG. 1) of the rotor core 11, and a second end plate 16 fixed to the rotating shaft 20 at the axially left side (the left side in FIG. 1) of the rotor core 11.

The rotor core 11 is formed in a shape of a thick-walled cylinder by laminating a plurality of circular magnetic steel sheets each formed with a through hole 11a at its center. The rotor core 11 is fixed to the outer periphery of the rotating shaft 20 by inserting the rotating shaft 20 through the through hole 11a. The outer peripheral surface of the rotor core 11 facing the inner peripheral surface of the stator is formed with the four magnet accommodating holes 12 which are evenly spaced in the circumferential direction. Each of the magnet accommodating holes 12 has a rectangular shape in the cross-section perpendicular to the center axis line of the rotor core 11. Each of the magnet accommodating holes 12 is formed such that the line parallel to and equidistant from the shorter sides thereof extends in the radial direction of the rotating shaft 20.

Each magnet accommodating hole 12 accommodates one of the magnets 13 having a rectangular cross-section. The magnet 13 is embedded in the magnet accommodating hole 12 such that the two long sides of the cross-section are located at the side of the inner periphery and the side of the outer periphery of the rotor core 11, respectively. The magnet 13 is magnetized to a N-pole at one of the inner and outer sides, and magnetized to a S-pole at the other side. In this embodiment, the four magnets 13 are magnetized such that magnetic polarity alternates in the circumferential direction, so that four magnetic poles (two N-poles and two S-poles) are formed along the circumference of the rotor 10. The axial length of the magnet 13 is shorter than that of the magnet accommodating hole 12. The magnet 13 is embedded in the magnet accommodating hole 12 in such a state that its one axial end surface at the axially left side in FIG. 1 (referred to as "the second axial side" hereinafter) is flush with one axial end surface at the second axial side of the rotor core 11, and its other axial end surface at the axially right side in FIG. 1 (referred to as "the first axial side" hereinafter) is located inward from the opening at the first axial side of the magnet accommodating hole 12.

The resin portion 14 is formed by injecting molten resin consisting primarily of epoxy resin, for example, into the space within the magnet accommodating hole 12, and solidifying the injected molten resin. In this embodiment, the entire space within the magnet accommodating hole 12 is filled by the resin portion 14. That is, both the space at the first axial side of the magnet 13 accommodated in the magnet accommodating hole 12 (this space being referred to as "the first axial side space" hereinafter), and the space between the peripheral surface of the magnet 13 and the wall surface of the magnet accommodating hole 12 (this space being referred to as "the peripheral side space" hereinafter) are filled by the resin portion 14. The resin portion 14 serves as mold resin for fixing the magnet 13 accommodated in the magnet accommodating hole 12 to the rotor core 11.

The first end plate 15 disposed at the first axial side (the right side in FIG. 1) of the rotor core 11 is an aluminum metal plate shaped in a ring. The outer diameter of the first end plate 15 is approximately the same as the outer diameter of the rotor core 11. The first end plate 15 is shrink-fitted and fixed to the outer peripheral surface of the rotating shaft 20. The interference of the shrink fitting between the first end plate 15 and the rotating shaft 20 is set sufficiently large so that the axial fixing force of the first end plate 15 against the rotating shaft 20 is larger than the axial fixing force of the second end plate 16 against the rotating shaft 20. The first end plate 15 is in surface contact with the axial end surface at the first axial side of the rotor 11. Accordingly, a part of the resin portion 14 accommodated in the magnet accommodating hole 12 is present within the axial area between the end surface at the first axial side of the magnet 13 accommodated in this magnet accommodating hole 12 and the first end plate 15. That is, the resin portion 14 filled in the magnet accommodating hole 12 is present also in the axial area between the magnet 13 and the first plate 15.

On the other hand, the second end plate 16 disposed at the second axial side (the left side in FIG. 19) of the rotor 11 is a steel metal plate shaped in a ring. The outer diameter of the second end plate 6 is approximately the same as the outer diameter of the rotor core 11. The bending rigidity of the second end plate 16 is higher than that of the first end plate 15. The second end plate 16 is shrink-fitted and fixed to the outer peripheral surface of the rotating shaft 20. The interference of the shrink fitting between the second end plate 16 and the rotating shaft 20 is set sufficiently small so that the axial fixing force of the second end plate 16 against the rotating shaft 20 is smaller than that of the first end plate 15.

Since the second end plate 16 is in direct contact with the magnets 13, the heat generated while the rotor 10 rotates can be dissipated through the magnets 13 and the second end plate 16. Hence, the rotor 10 according to the first embodiment has excellent heat radiating capability, and accordingly reduction of its performance is small.

At least a part of the resin portion 14 filled in the magnet accommodating hole 12 is present within the axial area between the magnet 13 accommodated in this magnet accommodating hole 12 and the first end plate 15. That is, the rotor 10 according to the first embodiment is configured such that the resin portion 14 is present at the side of the first end plate 15 the fixing force of which against the rotating shaft 20 is larger within the magnet accommodating hole 12. This configuration makes it possible that the effect due to the difference in linear expansion coefficient between the metal material of the rotor core 11 or magnets 13 and the resin material of the resin portion 14 exerts less influence on the second end plate 16, so that the fixing force between the second end plate 16 and the rotating shaft 20 can be prevented from decreasing.

Since the axial bending rigidity of the first end plate 15 is smaller than that of the second end plate 15, the effect due to thermal expansion of the resin portion 14 can be more concentrated to first end plate 15. As a result, since the influence exerted on the second end plate 16 by the effect due to thermal expansion of the resin portion 14 can be reduced, the fixing force of the second end plate 16 against the rotating shaft 20 can be reliably prevented from decreasing.

Modification 1

Figure 3:
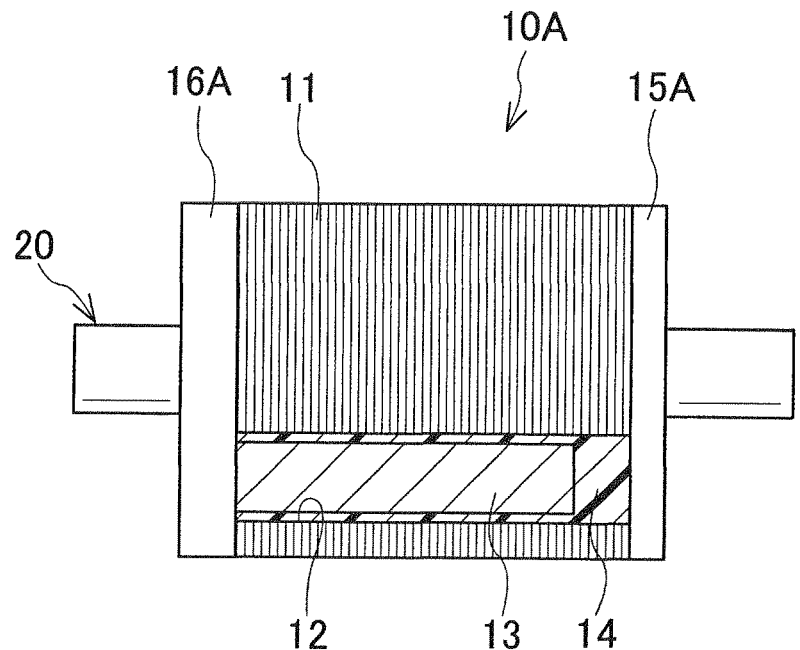
FIG. 3 is an axial cross-sectional view of a rotor according to modification 1 of the first embodiment of the invention.
Figure 4:
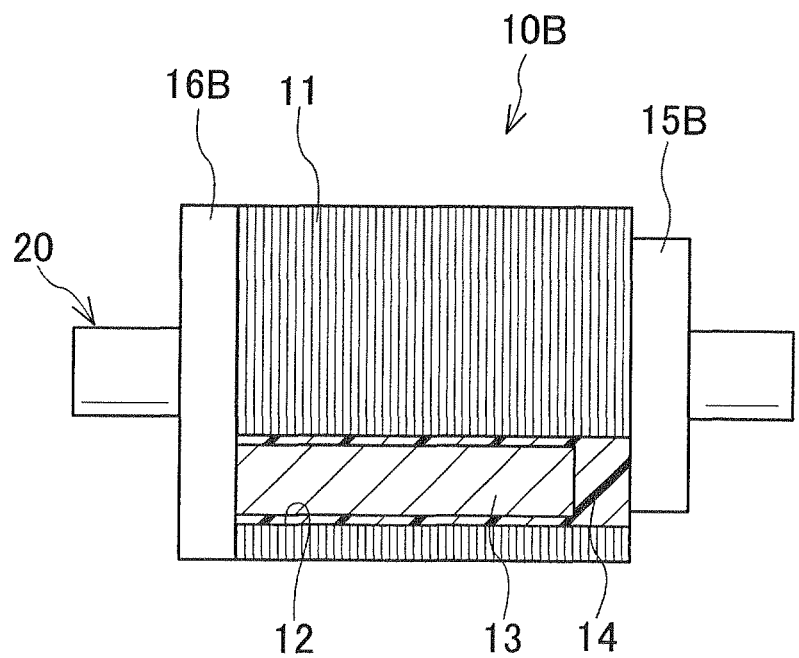
FIG. 4 is an axial cross-sectional view of a rotor according to modification 2 of the first embodiment of the invention.

In the first embodiment described above, the first endplate 15 and the second end plate 16 are made of different materials so that the axial bending rigidity of the first end plate 15 is lower than that of the second end plate 16. However, in a rotor 10A shown in FIG. 3 as a modification 1 of the rotor 10, the plate thicknesses of a first endplate 15A and a second end plate 16A are made different from each other, so that the axial bending rigidities of the first and second end plates 15A and 16A are different from each other although they are made of the same material.

More specifically, in the modification 1, the plate thickness of the first end plate 15A is smaller than that of the second end plate 16A, so that the axial bending rigidity of the first end plate 15A is smaller than that of the second end plate 16A. However, the fixing force between the first end plate 15A and the rotating shaft 20 is higher than that between the second end plate 16A and the rotating shaft 20.

Modification 2

In the first embodiment, the interference of the shrink fitting between the first end plate 15 and the rotating shaft 20 is different from that between the second end plate 15 and the rotating shaft 20, so that the axial fixing force between the first endplate 15 and the rotating shaft 20 is different from that between second end plate 15 and the rotating shaft 20. However, in a rotor 10B shown in FIG. 3 as a modification 2 of the rotor 10, a first end plate 15B is formed integrally with the rotating shaft 20, so that the axial fixing force between the first end plate 15A and the rotating shaft 20 is higher than that between a second endplate 16A and the rotating shaft 20.

According to the modification 2, it is possible to reduce the parts count compared to the first embodiment. Further, the first end plate 15B can be used as a stopper or a positioning member for the rotor core 11 at the time of assembling the rotor core 11 to the outer periphery of the rotating shaft 20 to facilitate the assembly work.

Second Embodiment

Figure 5:
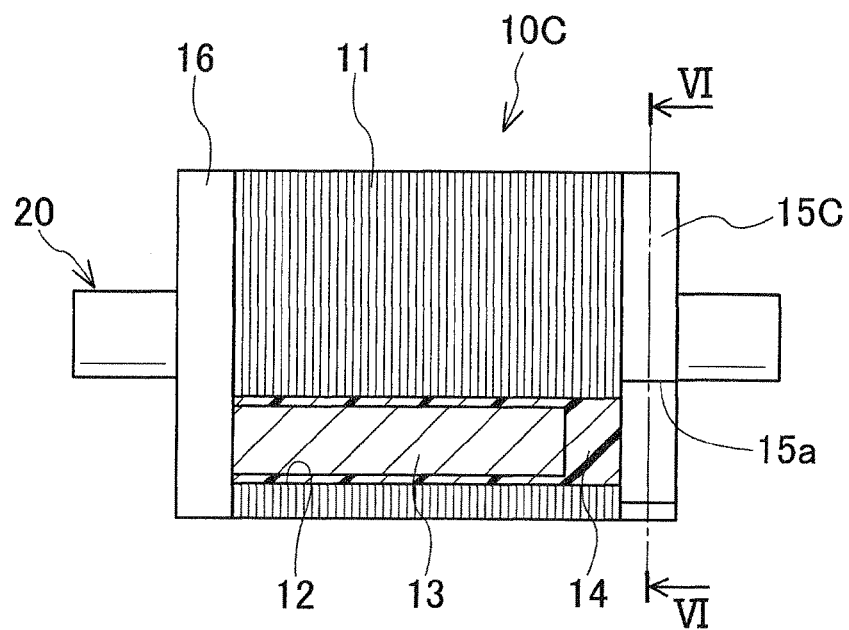
FIG. 5 is an axial cross-sectional view of a rotor according to a second embodiment of the invention.
Figure 6:
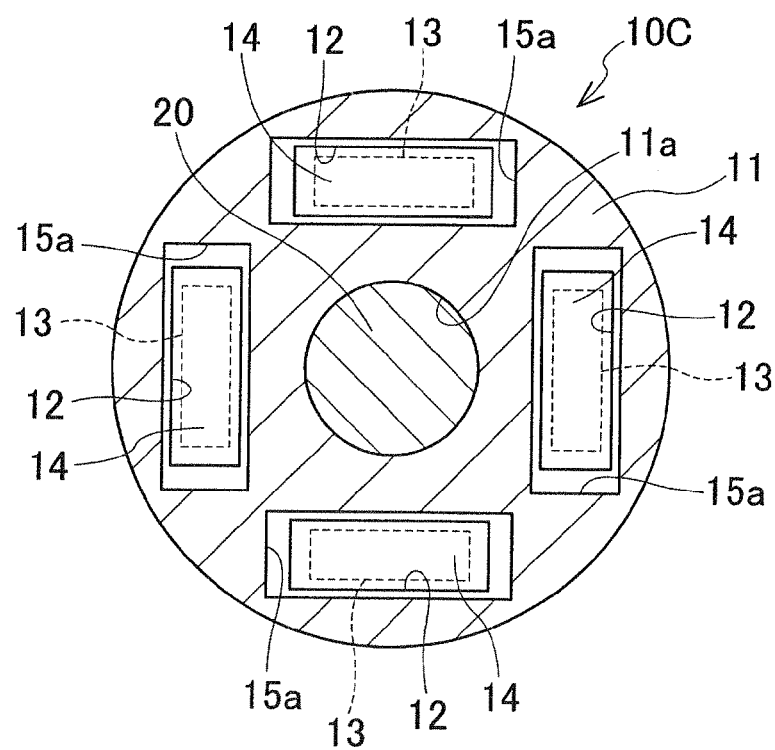
FIG. 6 is a cross-sectional view of FIG. 5 taken along line VI-VI.

Next, a rotor 10C according to a second embodiment of the invention is described with reference to FIGS. 5 and 6. As shown in FIGS. 5 and 6, the second embodiment differs from the first embodiment only in the structure of the first end plate. Accordingly, the second embodiment is described focusing on this difference.

A first end plate 15C of the rotor 10C is formed with a perforation 15a penetrating through the first end plate 15C at a portion axially facing the resin portion 14 exposed to the opening at the first axial side (the right side in FIG. 5) of the magnet accommodating hole 12. The perforation 15a is formed in four places corresponding to the four magnet accommodating holes 12 of the rotor core 11. The perforation 15a has a rectangular cross-section larger than the rectangular cross-sections of the magnet accommodating hole 12 and the resin portion 14 in the direction perpendicular to the axis of the rotating shaft 20.

In the second embodiment, when the rotor 10C rotates and generates heat, causing the resin portion 14 to expand toward the first axial side, since the resin portion 14 intrudes into the perforation 15a, the first end plate 15C can be prevented from being pressed by the resin portion 14. Accordingly, the pressing force caused by a thermal expansion of the resin portion 14 is not transmitted to the first end plate 15C fixed to the rotating shaft 20 by the larger fixing force. As a result, since the effect due to a thermal expansion of the resin portion 14 (a reaction force toward the second end plate 16) can be prevented from being exerted on the second end plate 16 fixed to the rotating shaft 20 by the smaller fixing force, the fixing force of the second end plate 16 against the rotating shaft 20 can be prevented from decreasing.

The rotor 10C according to the second embodiment described above provides the same advantages as those provided by the rotor 10 according to the first embodiment. In addition, since the first end plate 15C is formed with the perforations 15a, the resin portions 14 do not press the first end plate 15C when the resin portions 14 expand toward the second axial end due to the heat generated by the rotor 10C, because the expanded resin portions 14 intrude into the perforations 15a. Accordingly, the fixing forces of the first and second end plates 15C and 16 against the rotating shaft 20 can be prevented from decreasing. Particularly, the smaller fixing force of the second end plates 16 against the rotating shaft 20 can be effectively prevented from decreasing.

Incidentally, it is possible to form the perforations 15a in the first end plate 15C because of the reason that the fixing force of the first endplate 15C against the rotating shaft 20 is larger than that of the second end plate 16. That is, if the second endplate 16 is formed with perforations, the rigidity of the second end plate 16 is lowered, and accordingly the fixing force of the second endplate 16 against the rotating shaft 20 is substantially lowered.

Modification 3

Figure 7:
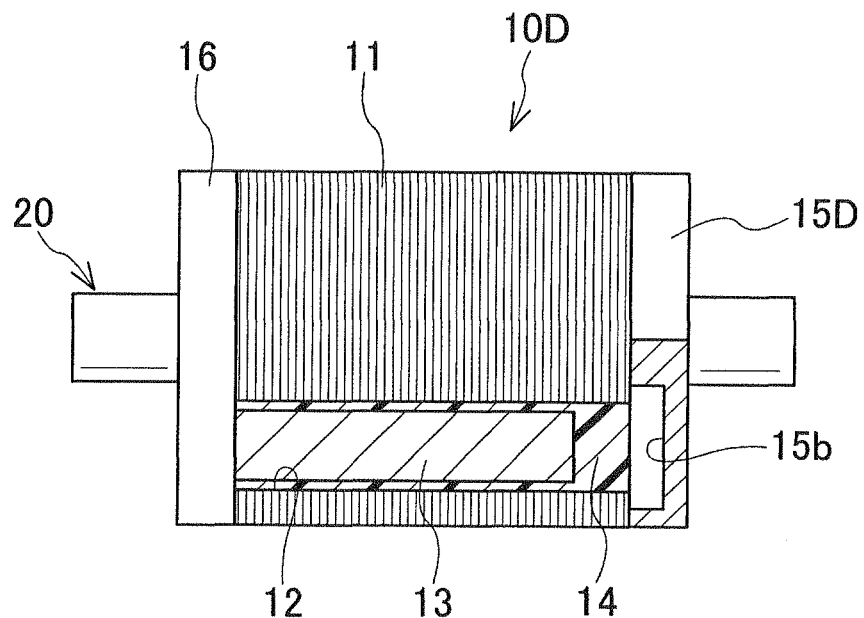
FIG. 7 is an axial cross-sectional view of a rotor according to modification 3 of the second embodiment of the invention.

In the second embodiment, the perforations 15a are formed so as to penetrate through the first end plate 15C in the plate thickness direction. However, in a rotor 10D as a modification 3 of the second embodiment, a first end plate 15D is formed with recesses 15b at portions axially facing the resin portions 14 at the first axial side (the right side in FIG. 7) instead of being formed with perforations. The modification 3 provides, in addition to the advantages provided by the second embodiment, an advantage that the resin portions 14 can be prevented from being exposed to the side of the first end plate 15D.

Third Embodiment

Figure 8:
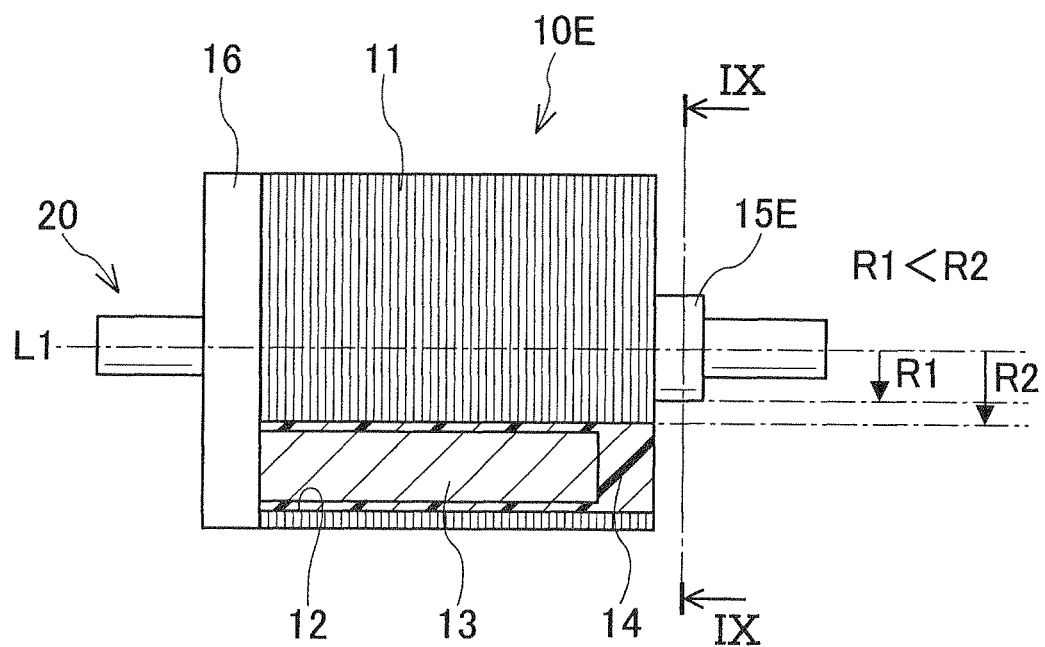
FIG. 8 is an axial cross-sectional view of a rotor according to a third embodiment of the invention.
Figure 9:
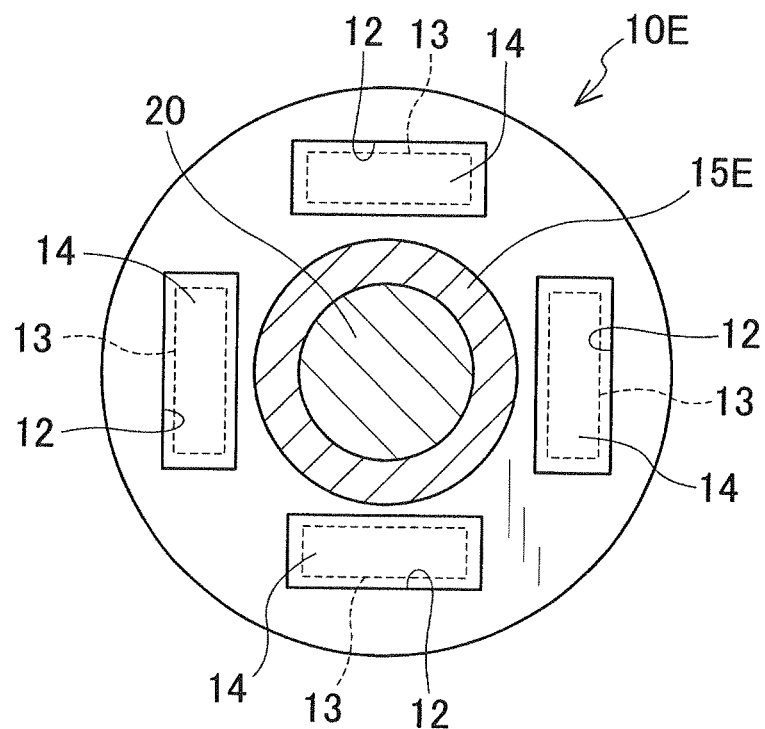
FIG. 9 is a cross-sectional view of FIG. 8 taken along line IX-IX.

Next, a rotor 10E according to a third embodiment of the invention is described with reference to FIGS. 8 and 9. As shown in FIGS. 8 and 9, the third embodiment differs from the first embodiment only in the structure of the first end plate. Accordingly, the third embodiment is described focusing on this difference.

A first end plate 15E of the rotor 10E is configured such that the radially outer end thereof is located more radially inward than the radially inner ends of the magnet accommodating holes 12 and the resin portions 14. That is, in this embodiment, when the distance between the axis line L1 of the rotating shaft 20 and the outer peripheral end of the first end plate 15E is R1, and the distance between the axis line L1 of the rotating shaft 20 and the inner peripheral ends of the magnet accommodating holes 12 and the resin portions 14 is R2, the relationship of R1<R2 is satisfied, so that the first end plate 15E and the resin portions 14 do not radially overlap with each other. Accordingly, in the third embodiment, like in the second embodiment and the modification 3, the first end plate 15E does not axially face the resin portions 14 exposed to the openings at the first axial side of the magnet accommodating holes 12.

Hence, also in this embodiment, the resin portions 14 do not press the first end plate 15E when the resin portions 14 expand toward the first axial side, and accordingly the fixing force of the first plates 15E and also the fixing force of the second end plate 16 against the rotating shaft 20 can be prevented from decreasing.

The rotor 10E according to the third embodiment provides the same advantages as those provided by the rotor 10C according to the second embodiment. In addition, since the first end plate 15E can be made much smaller than the first end plate 15C of the second embodiment and the first end plate 15D of the modification 3, the direct material cost can be reduced substantially.

Fourth Embodiment

Figure 10:
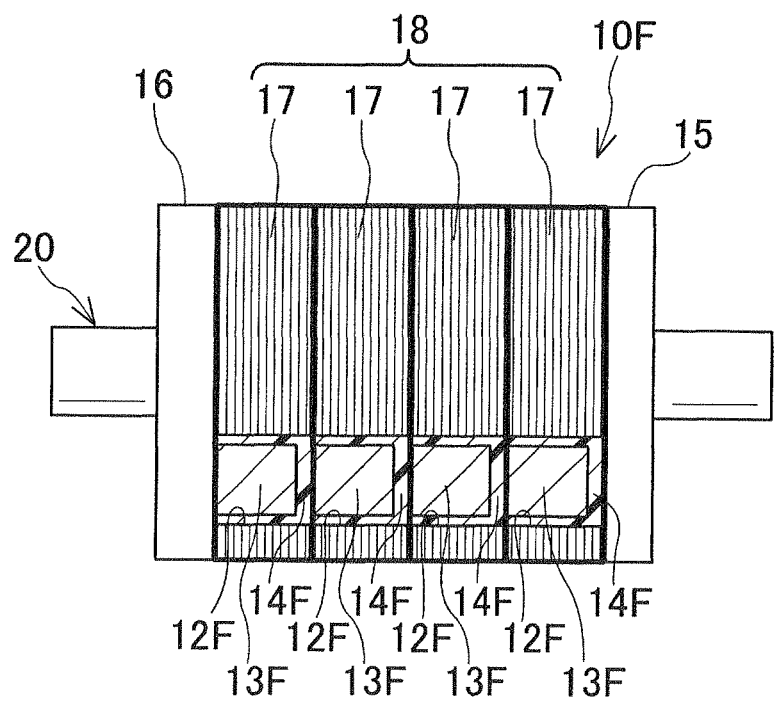
FIG. 10 is an axial cross-sectional view of a rotor according to a fourth embodiment of the invention.

Next, a rotor 10F according to a fourth embodiment of the invention is described with reference to FIG. 10. As shown in FIG. 10, the rotor 10F has a stacked body 18 including four split assemblies 17 stacked in the axial direction and fitted to the outer periphery of the rotating shaft 20, the first end plate 15 fixed to the rotating shaft 20 at the first axial side (the right side in FIG. 10) of the stacked body 18, and the second end plate 16 fixed to the rotating shaft 20 at the first axial end side (the left side in FIG. 10) of the stacked body 18. The axial fixing force of the second end plate 16 against the rotating shaft 20 is smaller than that of the first end plate 15.

In the fourth embodiment, the rotor core 11, magnets 13 and the resin portions 14 as described in the first embodiment are replaced by the stacked body 18 having the four split assemblies 17 stacked in the axial direction. Except for this, the fourth embodiment is the same in structure as the first embodiment. Accordingly, the fourth embodiment is described focusing on this difference.

The stacked body 18 is formed by stacking the four split assemblies 17 having the same structure in the axial direction. Each split assembly 17 is formed by assembling a split rotor core 11F, split magnets 13F and split resin portions 14F which are obtained by axially dividing the rotor core 11, the magnets 13 and the resin portions 14 described in the first embodiment into four pieces, respectively.

That is, in each split assembly 17, each one of four split-magnet accommodating holes 12F formed in the split rotor core 11F thereof accommodates one of the four split magnets 13F whose axial length is shorter than the axial length of the split-magnet accommodating holes 12F. As in the case of the first embodiment, the split magnet 13F is embedded in the split-magnet accommodating hole 12F in such a state that its one end surface at the second axial side (the left side in FIG. 10) is flush with the end surface at the second axial side of the split rotor core 11F, and its other end surface at the first axial side (the right side in FIG. 10) is located inward from the opening at the first axial side of the split-magnet accommodating hole 12F.

Accordingly, the first axial side space is formed at the first axial side of the split magnet 13F accommodated in the split-magnet accommodating hole 12F. Further, the peripheral side space is formed between the wall surface of the split-magnet accommodating hole 12F and the peripheral surface of the split magnet 13F. The split resin portion 14F is entirely filled in the first axial side space and the peripheral side space. That is, the split resin portion 14F filled in the first axial side space is present in the axial area between the end surface at the first axial side of the split magnet 13 and the first end plate 15.

The four split assemblies 17 having the same structure and oriented in the same direction are stacked in the axial direction to form the stacked body 18. Accordingly, of the four split assemblies 17, the one on the second axial side (the leftmost side in FIG. 10) is disposed in such a state that the end surface at the second axial side of the split rotor core 11F and the end surface at the second axial side of the split magnet 13 accommodated in the split-magnet accommodating hole 12F are in surface contact with the end surface of the second end plate 16.

In the fourth embodiment, the four split magnets 13F are embedded in the four split-magnet accommodating holes 12F, respectively, such that magnetic polarity alternates in the circumferential direction, so that four magnetic poles (two N-poles and two S-poles) are formed in the circumferential direction.

The rotor 10F according to the fourth embodiment described above has the same advantages as the rotor 10 according to the first embodiment. In addition, the rotor 10F has an advantage that performance characteristics thereof can be set and changed easily by changing the number of split assemblies 17 constituting the blocked body 18 or the way to assemble the split assemblies 17. Further, since the main body of the rotor is divided into a plurality of pieces, and a plurality of the split magnets 13F are used, the eddy current loss of the rotor can be reduced.

Modification 4

Figure 11:
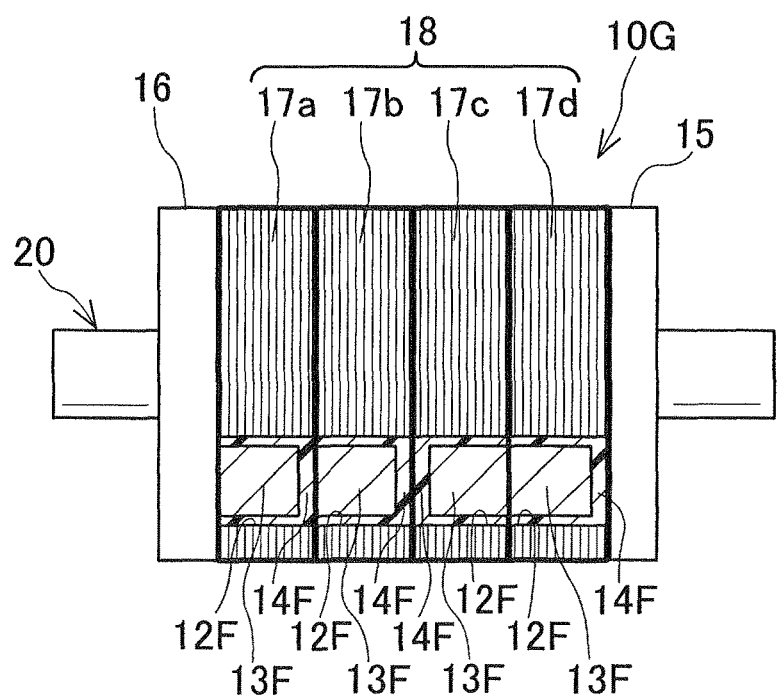
FIG. 11 is an axial cross-sectional view of a rotor according to modification 4 of the fourth embodiment of the invention.

In the fourth embodiment described above, the four split assemblies 17 constituting the stacked body 18 are oriented in the same direction. However, in a rotor 10G as a modification 4 of the fourth embodiment shown in FIG. 11, of the four split assemblies 17a to 17d, the two split assemblies 17b and 17c disposed axially inward are oriented in the opposite direction from that in the fourth embodiment. Only one of the split assemblies 17b and 17c may be oriented in the opposite direction from that in the fourth embodiment.

However, the orientation of the split assemblies 17a and 17d disposed axial ends of the stacked body 18 has to be unchanged. This is because, to ensure sufficient heat dissipation from the split magnets 13, the split magnets 13 accommodated in the split-magnet accommodating holes 12F have to be in contact with the second end plate 16. Further, to prevent reduction of the fixing forces of the first and second end plates 15 and 16 against the rotating shaft 20, a part of each split resin portion 14F has to be present between the end surface at the first axial side of the split magnet 13F accommodated in the split-magnet accommodating hole 12F of the split assembly 17d and the second end plate 16.

Other Embodiments

It is a matter of course that various modifications can be made to the above described embodiments as described below.

In the first embodiment, the first and second end plates 15 and 15 are shrink-fitted and fixed to the rotating shaft 20. However, they may be fixed to the rotating shaft 20 by pressure fitting, swaging or welding.

In the first embodiment, the resin portion 14 is made of epoxy resin. However, it may be made of polyester resin or phenol resin.

The rotors described in the above embodiments are for a vehicle-driving motor. However, the present invention is applicable to an electric rotating machine mounted on a vehicle as a motor or generator, or a motor-generator.

The above explained preferred embodiments are exemplary of the invention of the present application which is described solely by the claims appended below. It should be understood that modifications of the preferred embodiments may be made as would occur to one of skill in the art.

What is claimed is:

1. A rotor for an electric rotating machine comprising:
   a rotor core fixed to a rotating shaft of the electric rotating machine and formed with at least one magnet accommodating hole;
   a magnet accommodated in the magnet accommodating hole;
   a resin portion filled in the magnet accommodating hole accommodating the magnet;
   a first end plate fixed to the rotating shaft at a first axial side of the rotor core; and
   a second end plate fixed to the rotating shaft at a second axial side axially opposite to the first axial side of the rotor core, an axial fixing force of the second end plate against the rotating shaft being smaller than an axial fixing force of the first end plate against the rotating shaft;
   wherein
   a part of the resin portion is present in an axial area between the magnet accommodated in the magnet accommodating hole and the first end plate, and the magnet is in direct contact with the second end plate.

2. The rotor for an electric rotating machine according to claim 1, wherein axial bending rigidity of the first end plate is lower than axial bending rigidity of the second end plate.

3. The rotor for an electric rotating machine according to claim 1, wherein the first end plate is integrally formed with the rotating shaft.

4. The rotor for an electric rotating machine according to claim 1, wherein the first end plate is formed with a perforation at a portion axially facing the resin portion.

5. The rotor for an electric rotating machine according to claim 1, wherein the first end plate is formed with a recess at a portion axially facing the resin portion.

6. The rotor for an electric rotating machine according to claim 1, wherein a radially outer end of the first end plate is located more radially inward than a radially inner end of the resin portion.

7. The rotor for an electric rotating machine according to claim 1, wherein the rotor core, the magnet and the resin portion are axially divided into a plurality of split assemblies each including a split rotor core, a split magnet and a split resin portion, the plurality of the split assemblies being stacked in an axial direction of the rotor as a stacked body.

* * * * *